(12) United States Patent
Nelson

(10) Patent No.: US 10,159,379 B2
(45) Date of Patent: Dec. 25, 2018

(54) TWO SIDED GRILL WITH RELEASE SHEET COVERING

(71) Applicant: TAYLOR COMMERCIAL FOODSERVICE INC., Rockton, IL (US)

(72) Inventor: Dennis J. Nelson, Rockford, IL (US)

(73) Assignee: Taylor Commercial Foodservice Inc., Rockton, IL (US)

( * ) Notice: Subject to any disclaimer, the term of this patent is extended or adjusted under 35 U.S.C. 154(b) by 424 days.

(21) Appl. No.: 14/695,123

(22) Filed: Apr. 24, 2015

(65) Prior Publication Data

US 2015/0305556 A1 Oct. 29, 2015

Related U.S. Application Data

(60) Provisional application No. 61/983,552, filed on Apr. 24, 2014.

(51) Int. Cl.
*A47J 37/06* (2006.01)

(52) U.S. Cl.
CPC .... *A47J 37/0611* (2013.01); *A47J 2037/0617* (2013.01)

(58) Field of Classification Search
CPC .............. A47J 37/0611; A47J 2037/0617
USPC .................. 99/376, 377, 349, 422
See application file for complete search history.

(56) References Cited

U.S. PATENT DOCUMENTS

| | | | | |
|---|---|---|---|---|
| 2,881,299 A | * | 4/1959 | Jepson | A47J 37/0611 219/524 |
| 4,165,682 A | * | 8/1979 | Weiss | A47J 37/0611 219/524 |
| 4,320,699 A | * | 3/1982 | Binks | A47J 36/022 126/390.1 |
| 4,729,296 A | * | 3/1988 | Sabin | A47J 37/0611 99/349 |
| 6,247,392 B1 | * | 6/2001 | Yung | A47J 37/0611 220/23.87 |
| 6,718,866 B1 | * | 4/2004 | Robinson | A47J 37/0611 99/444 |
| 6,994,017 B2 | * | 2/2006 | Lerner | A47J 37/0611 99/376 |

FOREIGN PATENT DOCUMENTS

WO 2014144335 A1 9/2014

\* cited by examiner

*Primary Examiner* — Reginald L Alexander
(74) *Attorney, Agent, or Firm* — Brinks Gilson & Lione

(57) ABSTRACT

A grill is provided including a base structure. An upper platen assembly is connected to the base structure and includes an upper grilling surface having a first cooking surface. A lower platen assembly is connected to the base structure and includes a lower grilling surface having a second cooking surface. A release sheet is removably mounted to the grill. The release sheet has a central portion configured to cover at least the first cooking surface and a joint between the upper platen assembly and the lower platen assembly.

9 Claims, 6 Drawing Sheets

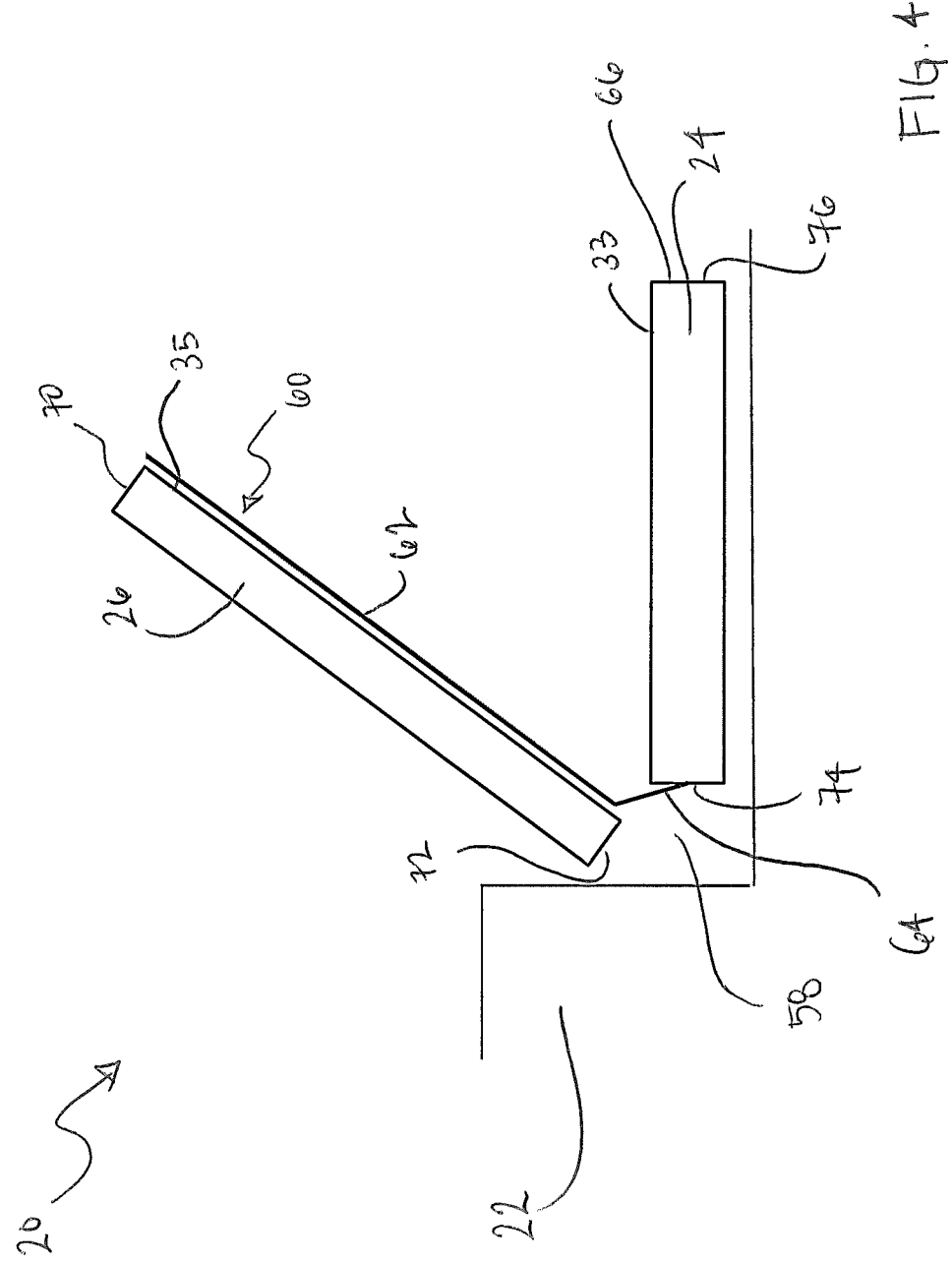

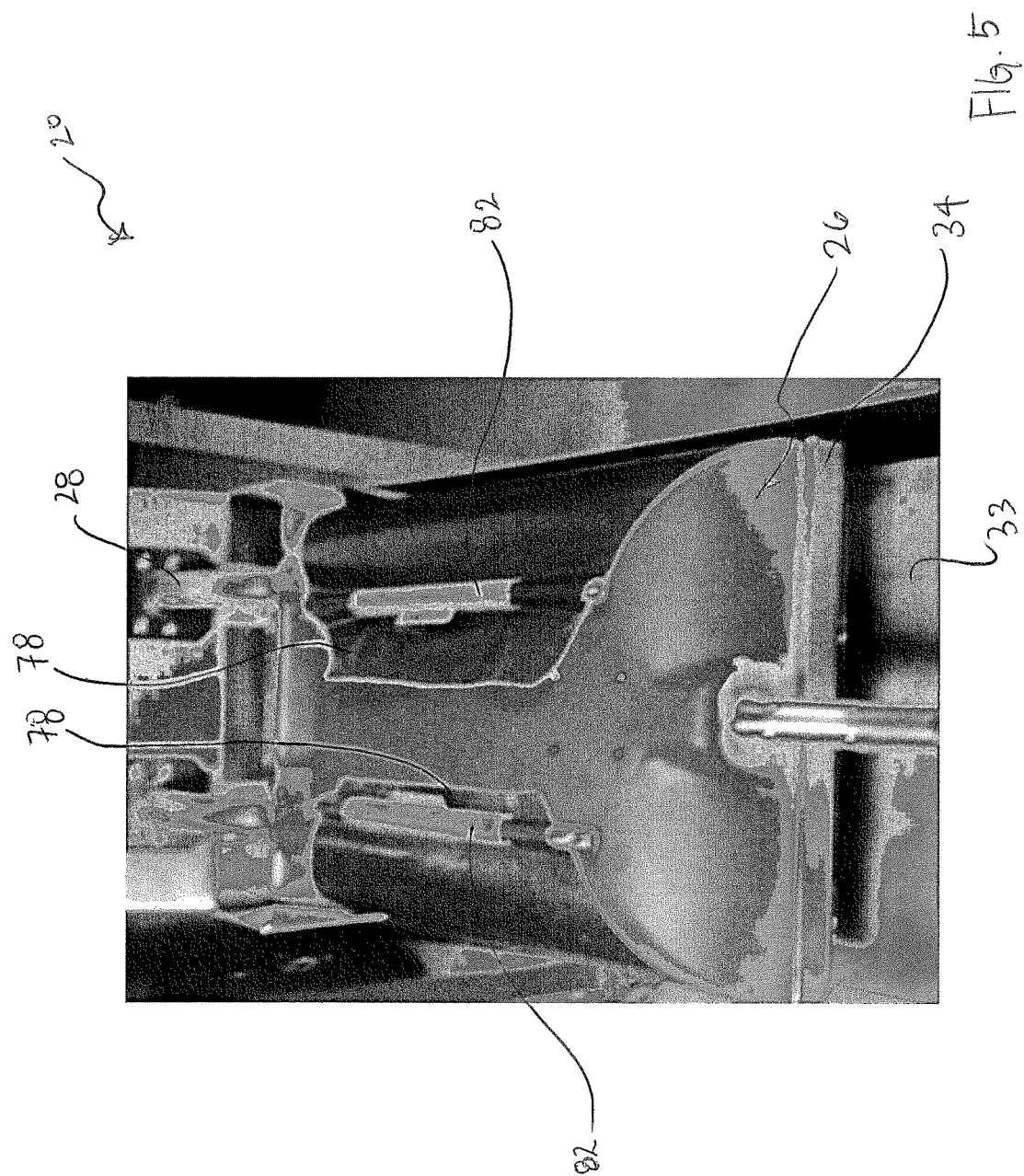

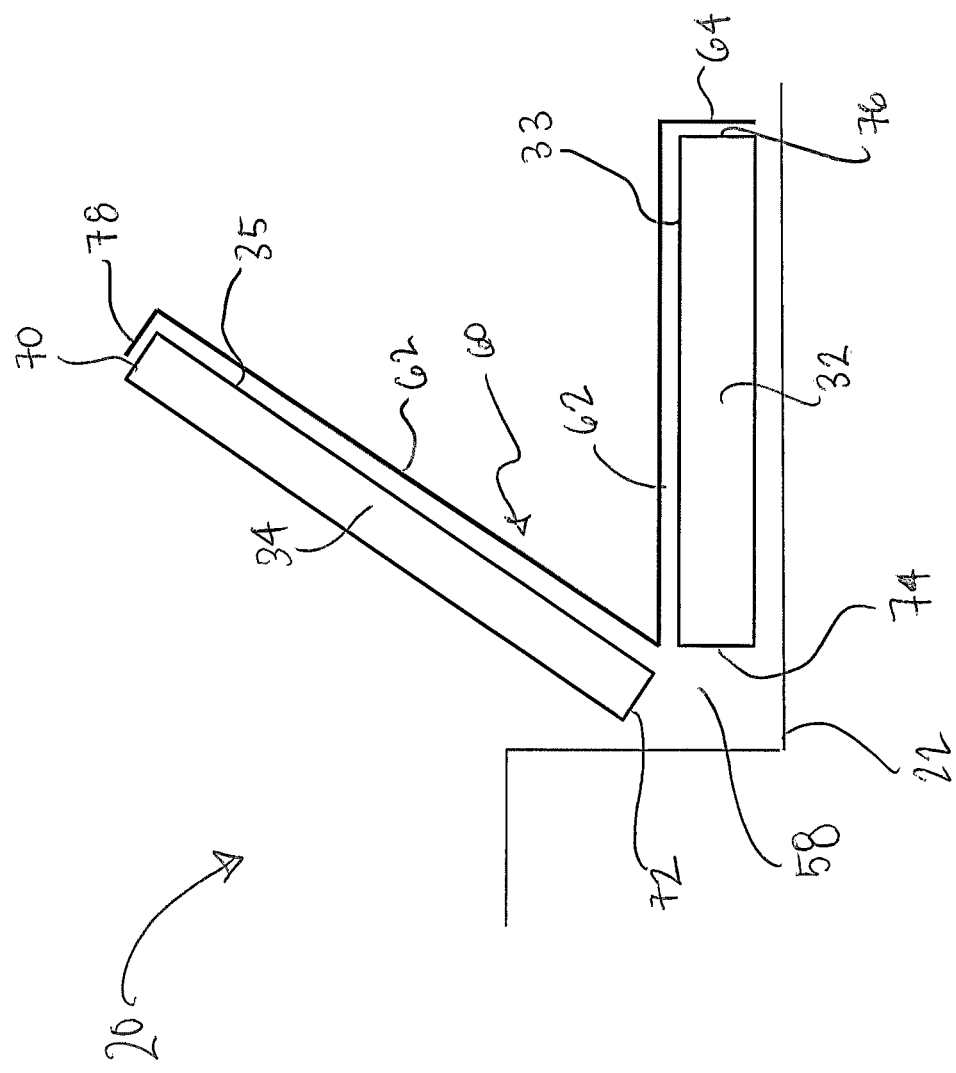

TWO SIDED GRILL WITH RELEASE SHEET COVERING

CROSS-REFERENCE TO RELATED APPLICATION

This application claims the benefit of U.S. provisional patent application Ser. No. 61/983,552 filed Apr. 24, 2014, the entire contents of which are incorporated herein by reference.

BACKGROUND OF THE INVENTION

The present invention relates generally to a grill, and more particularly to a release sheet for a two-sided grill.

Grills or griddles are used to cook various foods, such as hamburgers for example. In some conventional grills, the sides of the food are grilled sequentially. The food is placed on a grilling surface, thus grilling the side of the food that contacts the grilling surface. After that side of the food is cooked, the food is manually flipped to cook the opposite side. After both sides of the food are cooked, the food is manually removed from the grill for serving.

Other conventional grills, such as clamshell grills for example, are capable of simultaneously cooking two sides of various food items, such as hamburger patties, sausage patties, chicken, or other foods. In particular, clamshell grills are often used in commercial establishments, such as fast-food restaurants for example, because they reduce overall cooking time and the amount of operator attention required for cooking.

A conventional clamshell grill generally includes an upper platen assembly movably connected to a lower platen assembly. For example, the upper platen assembly may be pivotally coupled to the lower platen assembly for movement between a lower cooking position overlying the lower platen assembly and a raised position inclined upwardly from the lower platen assembly. When the upper platen assembly is in the lowered cooking position, a gap is created between the upper and lower platen assemblies. This gap is generally adjustable according to the thickness of the food being cooked. For example, hamburger patties are pre-formed in several different sizes (i.e. a quarter pound patty has a greater thickness than a regular patty). To cook the food, an operator selects the gap size and a cooking time via an operator interface for the food item being cooked.

One problem with conventional clamshell grills is that the compression force applied by the upper platen assembly on the food being cooked is limited to the weight of the platen. In addition, a portion of the grease vapor produced as food is being cooked will collect on the rear of the upper platen assembly. Because this area is difficult to access, the area is grease buildups occur that can cause performance issues and require additional maintenance of the grill.

BRIEF DESCRIPTION OF THE INVENTION

According to an embodiment of the invention, a grill is provided including a grill is provided including a base structure. An upper platen assembly is connected to the base structure and includes an upper grilling surface having a first cooking surface. A lower platen assembly is connected to the base structure and includes a lower grilling surface having a second cooking surface. A release sheet is removably mounted to the grill. The release sheet has a central portion configured to cover at least the first cooking surface and a joint between the upper platen assembly and the lower platen assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 schematically illustrates a front view of the grill in a raised position according to an embodiment of the invention;

FIG. 5 schematically illustrates a front view of the grill in a lowered position according to an embodiment of the invention; and FIG. 6 schematically illustrates a side view of the grill in a raised position according to an embodiment of the invention.

DETAILED DESCRIPTION OF THE INVENTION

Figure 1:
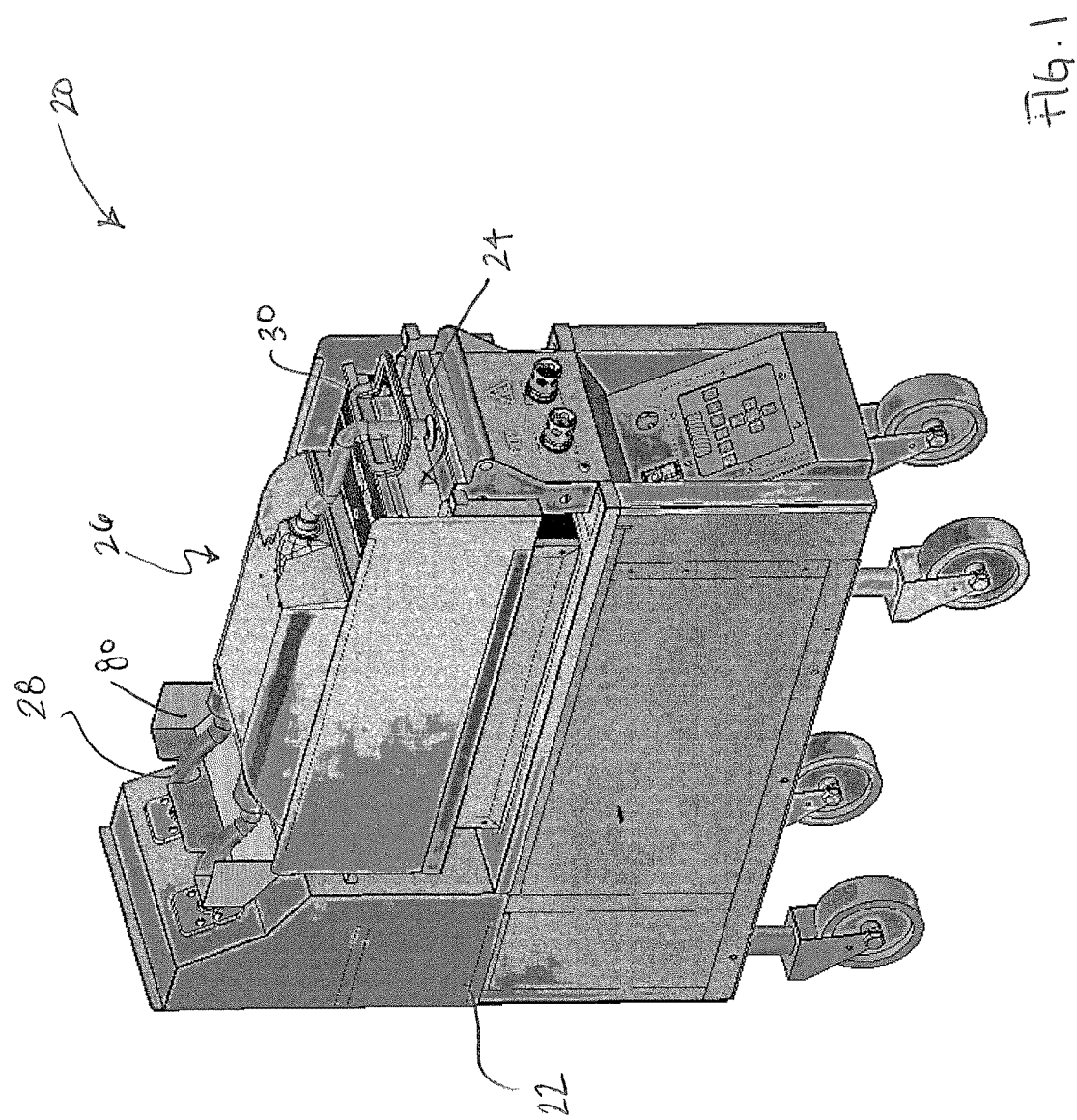
FIG. 1 schematically illustrates a perspective view of a grill in a lowered position according to an embodiment of the invention.
Figure 2:
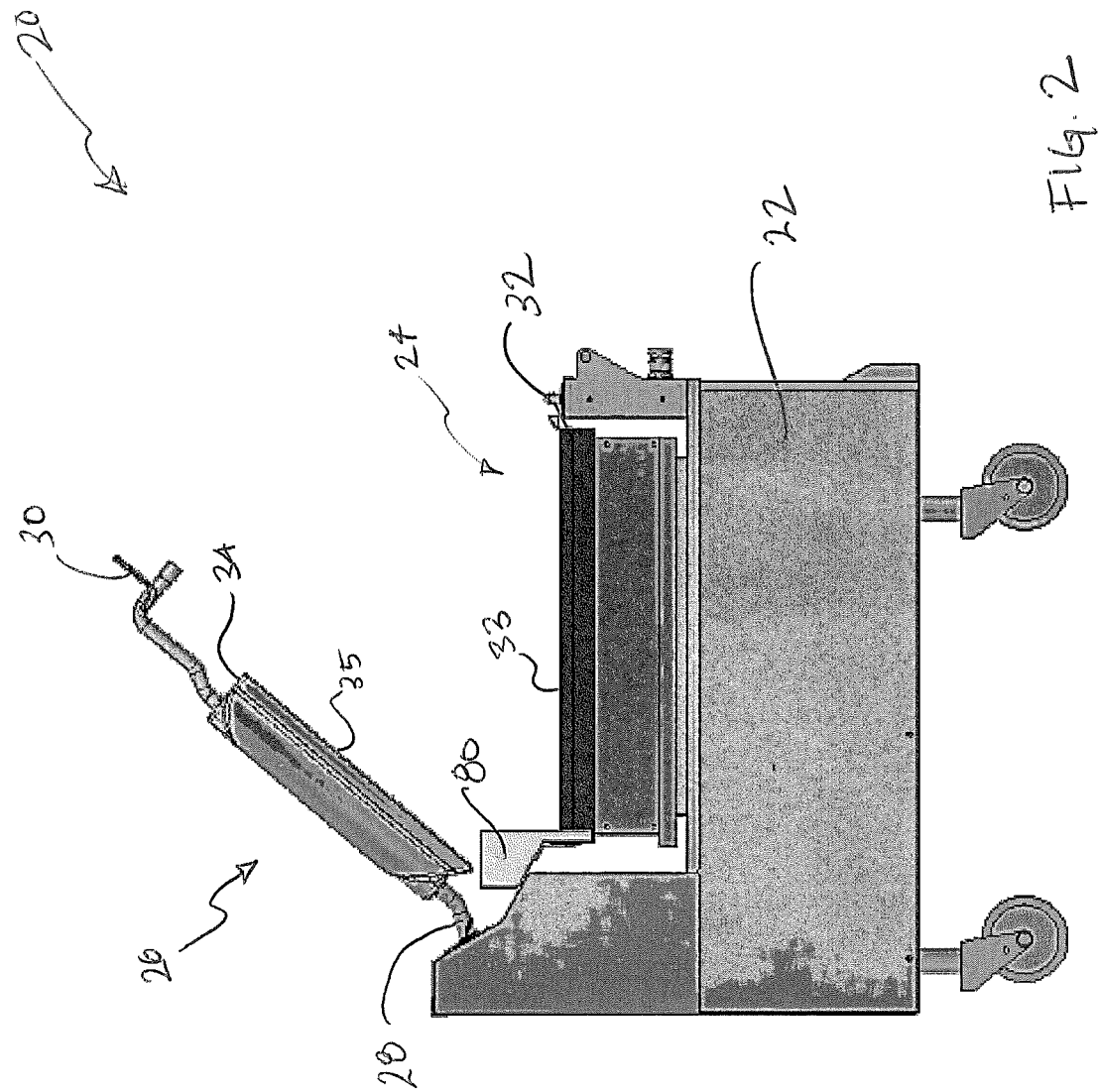
FIG. 2 schematically illustrates a perspective view of a grill in a raised position according to an embodiment of the invention.

Referring now to the FIGS., a grill 20 is illustrated having a rigid base structure 22 supporting a lower platen assembly 24 and an upper platen assembly 26. The upper platen assembly 26 may be fixed relative to the base structure 22 or alternatively, may be movably attached to the base structure 22 with a mounting structure 28 such that the upper platen assembly 26 is configured to move between a lowered, cooking position (FIG. 1) and an upper raised position (FIG. 2) relative to the lower platen assembly 24. In one embodiment, the mounting structure 28 is a hinge such that the upper platen assembly 26 is configured to pivot relative to the lower platen assembly 24; however, in other embodiments, the upper platen assembly 26 may be vertically lowered and raised in a generally linear motion. The upper platen assembly 26 may be moved between the raised and lowered positions either automatically or manually. In embodiments where the upper platen assembly 26 is moved manually, the upper platen assembly 26 may include a handle 30 that can be grabbed by an operator to move the upper platen assembly 26 between the raised and lowered positions. When the upper platen assembly 26 is lifted by an operator to the raised position, the grilling surface 33 the lower platen assembly 24 is exposed.

The lower platen assembly 24 includes a lower grill plate 32 and the upper platen assembly 26 includes an upper grill plate 34. Food items are placed on an exposed grilling surface 33 of the lower grill plate 32 by the operator for cooking. The operator moves the upper platen assembly 26, such as via handle 30 for example, to the lowered position such that the one or more food items to be cooked are positioned within a gap 36 formed between the upper and lower grill plates 32, 34.

The lower grill plate 32 is configured to provide heat to the lower side of one or more food items placed thereon and the upper grill plate 34 is configured to provide heat to an upper side of the food items located on the lower grill plate 32. The upper and lower grill plates 32, 34 are heated by a heater (not shown) to cook the food items. In order to transmit heat to the food items cooked by the grill, the lower and upper grill plates 32, 34, respectively, may be formed of a heat-conducting material, such as cast aluminum, abrasion-resistant steel, cast iron, stainless steel, mild steel, a ceramic material, or other suitable heat conducting materials used in grills. Although the lower and upper grill plates 32, 34 are shown as having a rectangular shape, one or both of the grill plates 32, 34 may also be formed into other shapes, such as circular or oval shapes for example.

Figure 3:
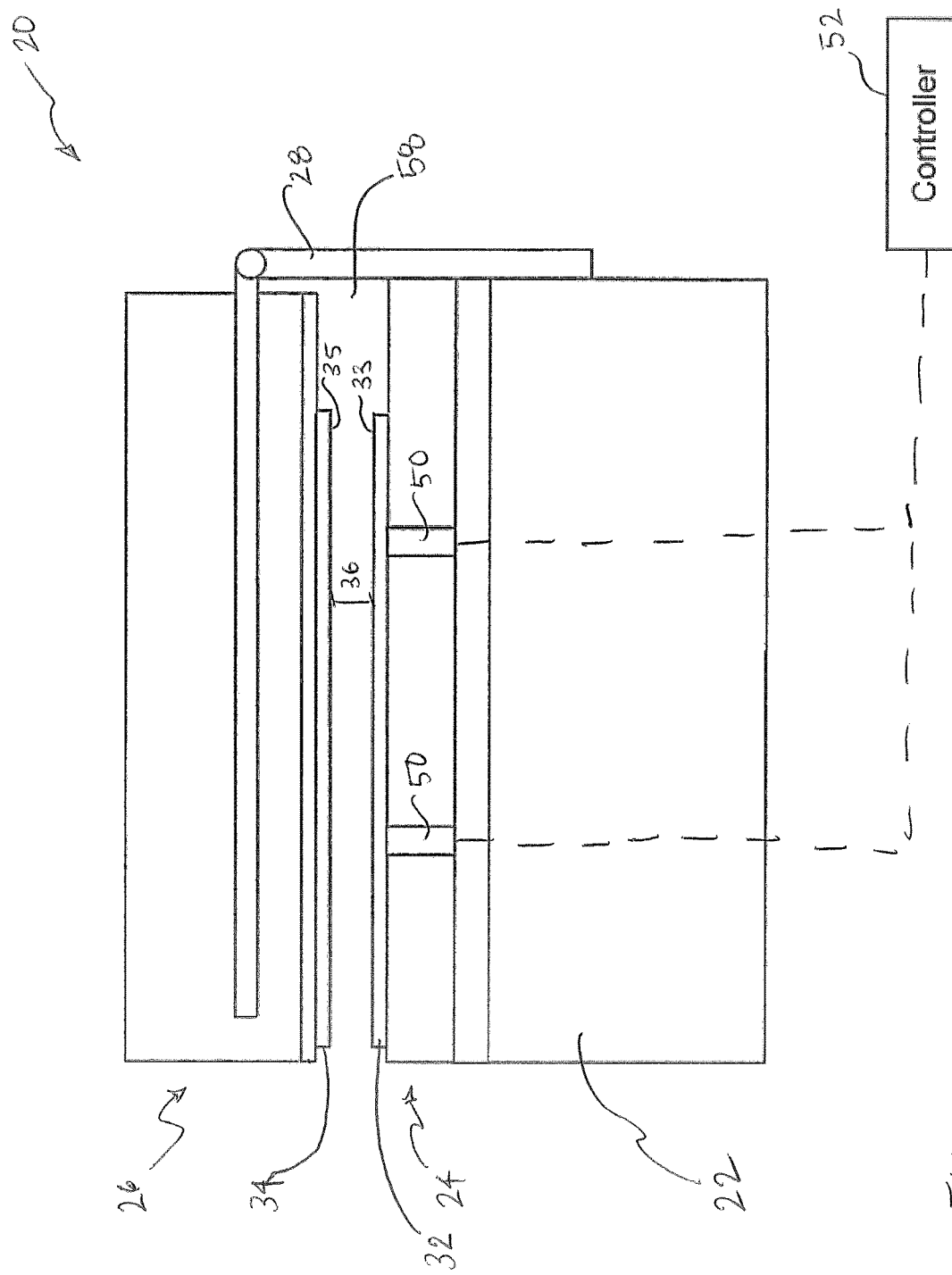
FIG. 3 schematically illustrates a cross-sectional view of a grill according to an embodiment of the invention.

In the illustrated non-limiting embodiment of FIG. 3, the lower platen assembly 24 of the grill 20 includes a plurality of leveling mechanisms 50 configured to control the tilt, angle, and/or attitude of the lower grill plate 32. However, in other embodiments, the grill 20 may be a conventional grill where the upper platen assembly 26 includes a plurality of leveling mechanisms such that the upper grill plate 34 is configured to move relative to the lower grill plate 32. A control 52 is configured to independently operate each of the plurality of leveling mechanisms 50. One or more sensors (not shown) are configured to monitor each of the plurality of leveling mechanisms 50 and detect when the lower grill plate 32 and the upper grill plate 34 are in contact. Through the leveling mechanisms 50, the position of one of the lower and upper grill plates 32, 34 and/or the initial gap 36 between the lower and upper grill plates 32, 34, respectively, may be adjusted to accommodate the variation of thickness of the food items to be cooked on the grill 20.

The grill 20 may be automatically calibrated to ensure that the gap 36 between the lower grill plate 32 and the upper grill plate 34 is maintained at a desired size. B calibrated, it is meant that the upper grill plate 34 and the lower grill plate 32 are level to one another to ensure proper cooking of food items. In one example, the grill 20 is calibrated daily to correct any unleveling of the lower grill plate 32 that may have occurred during the previous day.

Referring now to FIGS. 4-6, the grill 20 additionally includes a release sheet 60 positioned over the cooking surface 35 of the upper grill plate 34 and removably mounted to the upper platen assembly 26. Release sheet 60 generally covers the entire cooking surface 35 of the upper grill plate 34 to provide a non-stick surface such that food product will not stick to the upper grill plate 34 when the upper grill plate 34 is lifted off the food product. A body 62 of the release sheet 60 extends from adjacent a first end 70 of the upper grill plate 34 towards a second, opposite end 72 of the upper grill plate 34 located near the joint 58 such that the body 62 covers substantially all of the cooking surface 35 of the upper grill plate 34. In one embodiment, illustrated in FIG. 4, the body 62 additionally overlaps or covers the joint 58 formed between the upper platen assembly 26 and the lower platen assembly 24. In this embodiment, the free end 64 of the release sheet 60 may be configured to hang freely within the joint 58 or to mount to an adjacent component, such as a back end 74 of the lower grill plate 32 or to a portion of a backsplash 80 arranged within the joint 58. As such, grease that collects on release sheet 60 will travel to the end 64 of release sheet 60 to the lower grill plate 32, but not into the joint 58.

In another embodiment, illustrated in FIG. 6, the body 62 can be configured to cover both the cooking surface 35 of the upper grill plate 34 and the cooking surface 33 of the lower grill plate 32, along with the joint 58 between the two cooking surfaces 33, 35. In this embodiment, release sheet 60 can be a continuous sheet of material extending from a first end of the upper grill plate 34, over the joint 58, and to a distal end of the lower cooking plate 32.

In embodiments where the body 62 of the release sheet 60 extends over the entire cooking surface 33 of the lower grill plate 32, the free end 64 of the body 62 may be configured to attach to an exterior surface 66 of the lower platen assembly 24, such as near the distal end 76 thereof for example.

In either embodiment, the release sheet 60 is generally formed from a heat-resistant, non-stick material; however, embodiments where only the surface of the release sheet 60 configured to contact food has a non-stick coating is within the scope of the invention.

The release sheet 60 may additionally include at least one end 78 configured to mount to the upper platen assembly 26, such as by wrapping around an edge thereof for example. For example, in embodiments where the body 62 extends over the entire cooking surface 33 of the tower grill plate 32, the end 74 is arranged generally linearly with the body 62 and is configured to wrap about the first end 70 of the upper grill plate 34 (FIG. 6). In embodiments where the body 62 covers the joint 58, but not the cooking surface 33 of the lower grill plate 32, two ends 78 may extend from the sides of the body 62 of the release sheet 60 in a direction substantially perpendicular to the body 62. As shown in FIG. 5, the two ends 78 are configured to wrap about opposing edges of the upper platen assembly 26.

Each of the ends 64, 78 of the release sheet 60 may be removably mounted to a portion of the grill 20 by a retaining feature 82 biased into contact with an adjacent surface of the grill 20, such as an outer surface of the upper or tower platen assembly 24, 26 for example, by a biasing mechanism (not shown). To install an end 64, 78 of the release sheet 60, the retaining feature 82 is moved in a direction opposite the biasing force. Once the end 64, 78 is positioned such that a portion of the end 64, 78 extends beyond the retaining feature 82, the retaining feature 82 is released and biased back into contact with the adjacent surface, thus applying a pressure to the end 64, 78 of the release sheet 60.

By having the central portion 62 of the release sheet 60 covering the joint 58 between the upper and lower platen assemblies 24, 26, grease vapor is prevented from travelling and collecting in an area behind the upper platen assembly 26 that is difficult to clean. As a result, the grill 20 will remain cleaner and the overall reliability and performance of the grill 20 will improve.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A grill comprising:
   a base structure;
   an upper platen assembly connected to the base structure, the upper platen assembly including an upper grill plate having a first cooking surface;
   a lower platen assembly connected to the base structure and including a lower grill plate having a second cooking surface;
   a release sheet removably mounted to the grill, the release sheet having a body configured to cover at least the first cooking surface and a joint between the upper platen assembly and the lower platen assembly, wherein a distal end of the body is either mounted to a back surface of the lower platen assembly or is positioned within the joint between the upper platen assembly and the lower platen assembly; and
   at least one retaining feature including a biasing mechanism having a biasing force, the at least one retaining feature being mounted to the upper platen assembly, wherein the biasing force of the at least one retaining feature removably couples a portion of the release sheet to the grill.

2. The grill according to claim 1, wherein a free end of the body is removably mounted to a portion of the lower platen assembly.

3. The grill according to claim 2, wherein a free end of the body is removably mounted to a back end of the lower grill plate.

4. The grill according to claim 2, wherein a free end of the body is removably mounted to a front end of the lower grill plate.

5. The grill according to claim 4, wherein the body extends from a first end of the upper grill plate beyond a second, opposite end of the upper grill plate, such that the body covers the first cooking surface, the joint between the upper platen assembly and the lower platen assembly, and at least a portion of the second cooking surface.

6. The grill according to claim 1, wherein a free end of the body is removably mounted to a portion of a backsplash arranged within the joint between the upper platen assembly and the lower platen assembly.

7. The grill according to claim 1, wherein the release sheet further includes at least one end configured to removably mount to the upper platen assembly of the grill.

8. The grill according to claim 1, wherein the release sheet further includes a first end and a second end configured to wrap about opposing sides of the upper platen assembly and removably mount thereto, the first end and second end being arranged substantially perpendicular to the body.

9. The grill according to claim 1, wherein the release sheet is formed from a heat-resistant, non-stick material.

* * * * *